Sept. 18, 1951     S. N. LAVERENTS     2,568,454
ACCELERATOR CONTROL DEVICE
Filed March 8, 1950     2 Sheets-Sheet 1
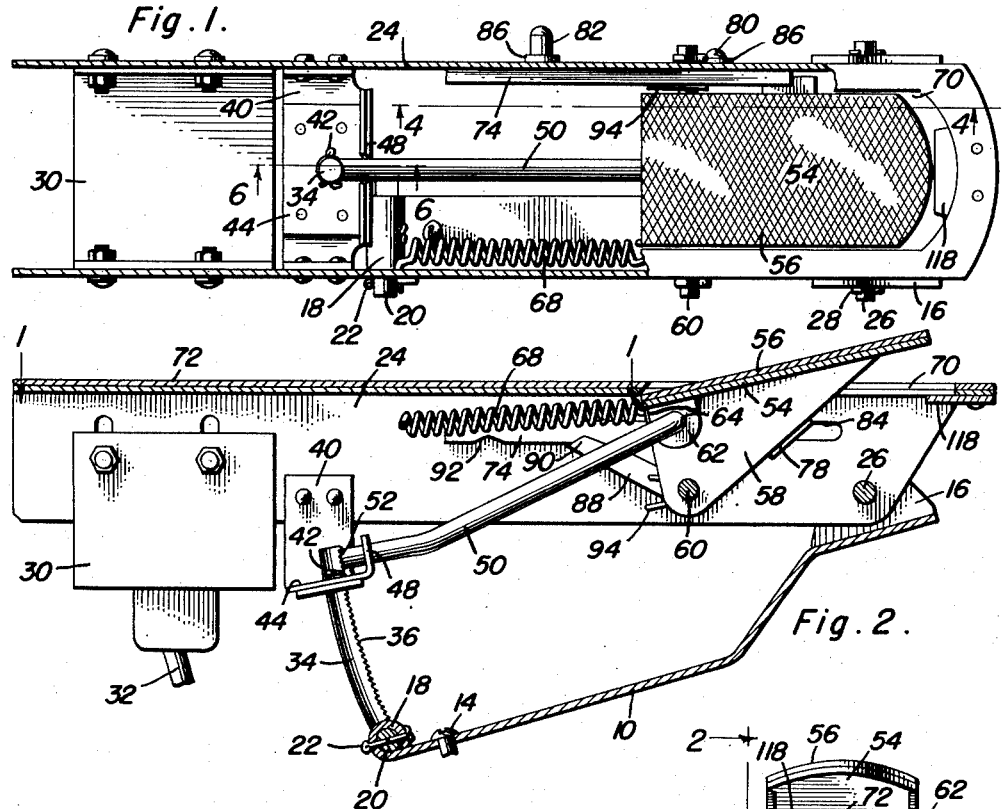
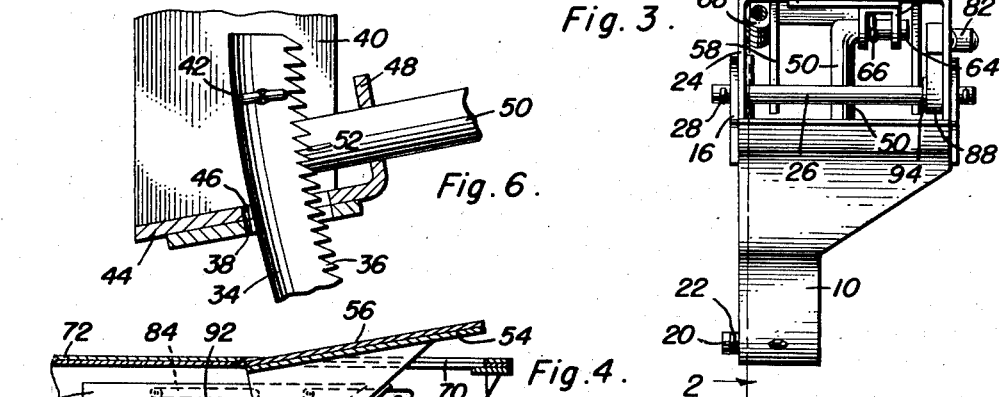
Inventor
Sidney N. Laverents
By *Clarence A. O'Brien and Harvey B. Jackson*
Attorneys Sept. 18, 1951  S. N. LAVERENTS  2,568,454
ACCELERATOR CONTROL DEVICE
Filed March 8, 1950  2 Sheets-Sheet 2

Sidney N. Laverents
INVENTOR.

BY
*Clarence A. O'Brien*
*and Harvey B. Jackson*
Attorneys

Patented Sept. 18, 1951

2,568,454

UNITED STATES PATENT OFFICE 2,568,454

ACCELERATOR CONTROL DEVICE

Sidney N. Laverents, San Diego, Calif.

Application March 8, 1950, Serial No. 148,331

8 Claims. (Cl. 74—513)

This invention relates to new and useful improvements in accelerator control devices and the primary object of the present invention is to provide a self-setting ratchet type foot accelerator pedal that is selectively retained in a predetermined depressed position.

Another important object of the present invention is to provide an accelerator control device including a throttle operating pedal, a locking mechanism for retaining the pedal in a selected depressed position so that a vehicle may operate at a relatively constant speed, and embodying a heel plate mounted on the pedal for operating the locking mechanism.

Yet another object of the present invention is the provision of a gas pedal having a locking mechanism associated therewith for holding the former in a predetermined depressed position and including a novel and improved operating means for the locking mechanism that is actuated by the brake pedal of a motor vehicle associated with the present invention.

A further object of the present invention is to provide a self-setting ratchet type foot pedal that is quickly and readily applied to the floor board of a motor driven vehicle in a convenient manner for connection with the throttle and brake pedal of the vehicle.

A still further aim of the present invention is to provide an accelerator control of the aforementioned character that is simple and practical in construction, strong and reliable in use, highly efficient in operation, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal horizontal sectional view taken substantially on the plane of section line 1—1 of Figure 2 and showing the heel plate in elevation;

Figure 2 is a a longitudinal vertical sectional view taken substantially on the plane of section line 2—2 of Figure 3;

Figure 3 is an end view of the present invention;

Figure 4 is a reduced, fragmentary, longitudinal, vertical sectional view taken substantially on the plane of section line 4—4 of Figure 1;

Figure 5 is a view similar to Figure 4 and showing the heel plate locked to the foot pedal in a depressed position;

Figure 6 is an enlarged, fragmentary, longitudinal vertical sectional view taken substantially on the plane of section line 6—6 of Figure 1;

Figure 7:
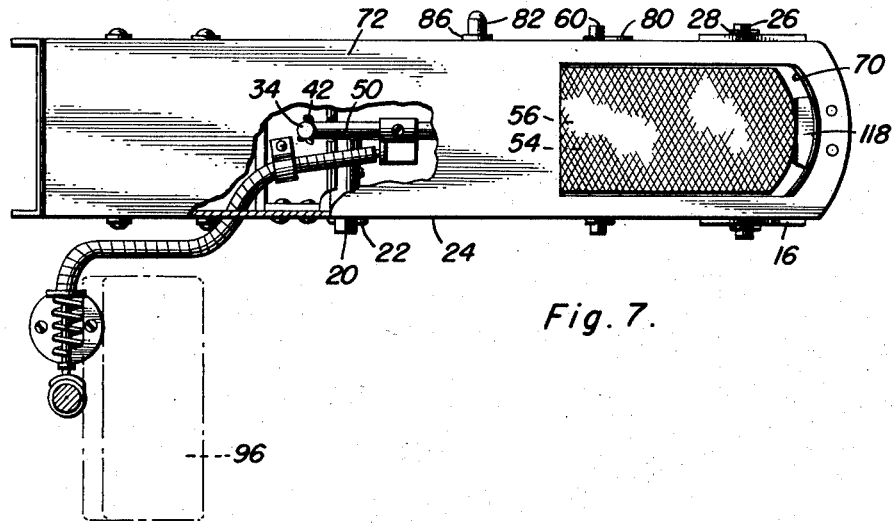
Figure 7 is a top plan view of the present invention, with parts broken away for the convenience of explanation, and showing the manner in which the auxiliary lock release mechanism is applied to the brake pedal (shown partially in dotted lines)

Referring now to the drawings in detail, wherein for the purpose of illustration, there is disclosed a preferred embodiment of the present invention, the numeral 10 represents an elongated base member or plate that is detachably secured to the floor board 12 of a motor vehicle by fasteners or the like 14.

The rear portion of the base member 10 is provided with a channel shaped offset 16 and the forward portion of the base member terminates in a sleeve 18 that receives a pin 20 held to the sleeve by a removable cotter pin or the like 22.

The channel shaped offset 16 receives one end of an elongated substantially channel-shaped foot pedal 24 and a pivot bolt or pin 26 extends through the legs of the channel shaped offset 16 and the legs of the channel shaped foot pedal 24. Removable holding pins or cotter pins 28 retain the pivot pin 26 relative to the channel-shaped offset and the foot pedal.

The forward free end portion of the foot pedal 24 slidably and adjustably supports a block 30 that is suitably secured to the throttle 32 of a motor driven vehicle on which the present invention is applied so that as the foot pedal is pressed downwardly, the speed of the vehicle will increase as is conventional for the gas pedals of vehicles.

One end of an arcuate ratchet 34 is fixed at one end to the pin 20 and the rear concaved edge of the ratchet is provided with teeth 36 for a purpose which will later be more fully apparent. The free end of the ratchet 34 is slidably received in a slot 38 provided in one leg of an angle member or guide 40 that is fixed to foot pedal 24 adjacent the free end portion thereof.

It should be noted, that the slot 38 is sufficiently large as to permit the foot pedal to be completely raised or depressed without effecting a binding of the ratchet in the said slot 38. A stop or pin 42 removably carried by the free end of the ratchet 34 will prevent disengagement of the ratchet from the guide 40.

The slotted leg of the guide 40 is reinforced by a strip 44 also having a slot 46 that registers with the slot 38 and which slidably receives the ratchet 34.

A guide ear or eye 48 rises from the plate 44 and slidably receives the forward end of an elongated and slightly bent locking bar or link 50 and the forward end of the locking bar is formed with a plurality of teeth 52 for selectively engaging the teeth 36 of the ratchet 34 in order to retain the foot pedal 24 in a selected depressed position.

Means is provided for disengaging the teeth 52 of the locking bar 50 with the teeth 36 of the ratchet 34, and this means consists of a heel plate 54 having a wear surface 56. Substantially triangular side flanges 58 depend from the heel plate 54 and the lower corners of the side flanges 58 are apertured to receive a removable pivot pin 60 that extends between the legs of the foot pedal 24 adjacent and spaced parallel to the pin 26.

A substantially channel-shaped anchor bracket 62 is fixed to the forward portion of the heel plate 54 and the legs of this anchor bracket are apertured to pivotally receive a lateral projection 64 at the rear end of the locking bar 50. A cotter pin 66 carried by the projection 64 is positioned between the legs of the anchor bracket to prevent disengagement of the locking bar from the anchor bracket (see Figure 3).

A longitudinally extending coil spring 68 is anchored at its forward end to one leg of the foot pedal 24 and the rear end of this spring 68 is fixed to one side flange 58 to normally urge the rear portion of the heel plate 54 upwardly through a slot or opening 70 in the web of the foot pedal and the teeth 52 of the locking bar 50 engaged with the teeth 36 of the ratchet 34, as shown best in Figure 2 of the drawings.

Means is provided for retaining the heel plate 54 flush or coplanar with the web of the foot pedal 24 and the wear surface 56 of the heel plate 54 flush or coplanar with the wear surface 72 of the foot pedal 24. This latest means comprises a slidable latch member or plate 74 having an inclined edge or cam surface 76 at one end for slidably engaging an abutment or plate 78 fixed between the longer edges of the side flanges 58 (see Figure 5).

A pair of pins 80 and 82 project laterally from the latch plate 74 and are slidably received in longitudinal slots 84 provided in one leg of the foot pedal 24. Obviously, the pins 80 and 82 are provided with suitable retaining means, such as shoulders 86, for retaining the pins to the foot pedal. The end portion of one of the pins, for example 82, projects well outwardly from the foot pedal to provide a means for manually sliding the latch plate 74.

Swingably or pivotally mounted on the pin 60, between one side flange 58 and one leg of the foot pedal 24, is a locking dog or arm 88 having a free end portion 90 for reception in a selected one of a plurality of longitudinally spaced recesses 92 in the lower edge of the latch plate 74. A coil spring 94 embraces the pin 60 and its ends are fixed to the foot pedal 24 and dog 88 to normally urge the latter to a raised position with the end 90 into a selected one of the recesses 92.

In practical use of the present invention, thus far described, the heel plate 54 is normally flush with the web of the foot pedal 24, as shown in Figure 5, and the dog 88 is received in one of the recesses 92 with the latch plate 74 over the abutment 78 to hold the heel plate against pivotal movement. When in this position, the present foot pedal functions as is normal for the gas pedal of a vehicle.

To retain the foot pedal in a predetermined depressed position, it is merely necessary to force the pin 82 forwardly thereby permitting the latch plate 74 to disengage the abutment 78 and the heel plate to pivot upwardly as shown in Figures 2 and 4. By releasing the heel from the heel plate 54 prior to the releasing or the toe from the foot pedal 24, the locking bar 50 will be urged forwardly so that the teeth 52 will engage the teeth 36 of the ratchet 34.

Figure 8:
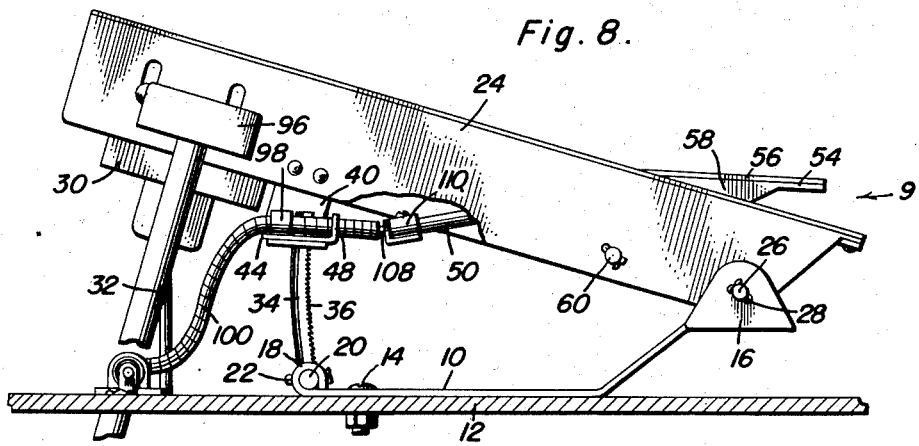
Figure 8 is a side elevational view of Figure 7 and showing the brake pedal in elevation.
Figure 9:
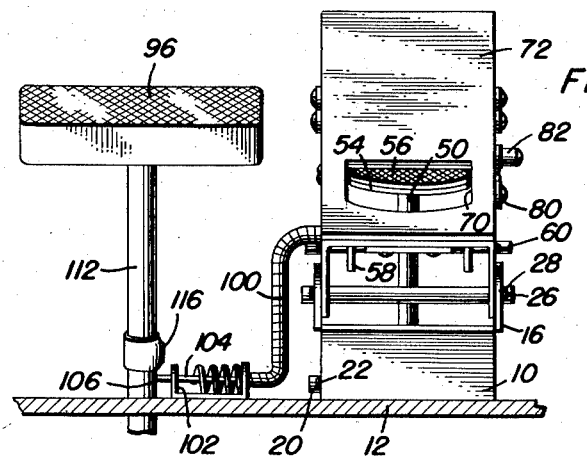
Figure 9 is a rear elevational view of Figure 8 taken substantially in the direction of arrow numbered 9.

Figures 7, 8 and 9 illustrate an auxiliary means for actuating the locking bar 50 and which means is operated by the usual brake pedal 96 of the motor vehicle.

Suitably mounted on the plate 44, is a support loop 98 that receives a flexible tubing 100 having one end fixed to a channel member 102 secured to the floor board 12. A flexible shaft 104 is slidably received in the tubing 100 and one of its ends, for example end 106, is slidably received in suitable apertures provided in the legs of the channel member 102 and the remaining end 108 of the shaft 104 projects outwardly from the tubing to abut an adjustable bearing member 110 carried by the locking bar 50.

A sleeve fixed to the shank 112 of the brake pedal 96 is provided with a cam surface 116 for slidably engaging the end 106 of the shaft 104 as the brake pedal 96 is depressed The above structure is a safety release for the locking bar 50 since when the driver applies his foot to the brake pedal, with the pedal 24 locked in a predetermined depressed position, the cam surface 116 will ride against the end 106 of the shaft 104 to move the shaft so that the end 108 thereof will force the bearing member 110 and locking bar 50 rearwardly disengaging the teeth 52 from the teeth 36.

A stop plate 118 fixed to the foot pedal 24 limits the downward pivotal movement of the heel plate 54 relative to the foot pedal 24.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An accelerator control device comprising a base plate, a foot pedal pivoted at one end to said base plate, means operatively connecting the free end of said pedal to the throttle of a motor vehicle, a ratchet pivotally secured to said base plate and underlying said foot pedal, a guide mounted on and depending from said pedal and slidably receiving the ratchet, a locking member carried by said pedal selectively engaging the teeth of said ratchet to retain the pedal in a predetermined depressed position, a further guide mounted on said first named guide and slidably receiving said locking member, and means carried by said pedal for operating said locking member.

2. An accelerator control device comprising a base plate, a foot pedal pivoted at one end to said base plate for vertical swinging movement, means operatively connecting the free end of said pedal to the throttle of a motor vehicle, a ratchet pivoted to said base plate beneath said pedal for vertical swinging movement, a guide mounted on said pedal slidably receiving the ratchet, another guide beneath the pedal, a locking member slidably carried by said last named guide selectively engaging the teeth of said ratchet to retain the pedal in a predetermined depressed position, a heel plate pivoted to said pedal and connected to said locking member for operating the latter, and means carried by the pedal for locking the heel plate to the pedal and against pivotal movement.

3. An accelerator control device comprising a base plate, a foot pedal pivoted at one end to said base plate, means operatively connecting the free end of said pedal to the throttle of a motor vehicle, a ratchet carried by said base plate, a guide mounted on said pedal slidably receiving the ratchet, locking means carried by said pedal selectively engaging the teeth of said ratchet to retain the pedal in a predetermined depressed position, a heel plate pivoted to said pedal and connected to said last mentioned means for operating the latter, and means normally urging said locking means into engagement with said ratchet 4. The combination of claim 3 wherein said means urging said locking means includes a coil spring anchored at one end to said pedal and its remaining end to said heel plate to retain the latter inclined to said pedal.

5. The combination of claim 4 and means for holding said heel plate substantially coplanar with said foot pedal.

6. The combination of claim 5 wherein said holding means includes a slidable latch, an abutment on said heel plate slidably receiving said latch, and a swingable locking element carried by said pedal and engaging said slidable latch to hold the same against sliding movement.

7. The combination of claim 6 wherein said latch includes a cam surface engageable with said abutment.

8. In combination with the foot operated brake pedal and throttle of a motor vehicle, an acelerator control device comprising, a base plate, a foot pedal pivoted at one end to said base plate for vertical swinging movement, means operatively connecting the free end of said foot pedal to the throttle, a ratchet pivoted on said base plate beneath the pedal, a guide carried by said foot pedal slidably receiving said ratchet, a second guide depending from the pedal, a locking member slidably carried by the second guide for selectively engaging the teeth of said ratchet, a heel plate pivoted on said foot pedal and connected to said locking member for operating said locking member into and out of engagement with said ratchet, means yieldingly urging said locking member into engagement with said ratchet, a first means for moving said locking member out of engagement with said ratchet, and a second means operated by the brake pedal for moving said locking member out of engagement with said ratchet.

SIDNEY N. LAVERENTS.

REFERENCES CITED

The following references are of record in the file of this patent:

UNITED STATES PATENTS

| Number | Name | Date |
| --- | --- | --- |
| 1,302,112 | Wilkins | Apr. 29, 1919 |
| 1,553,280 | Wright | Sept. 8, 1925 |
| 1,662,211 | Shier | Mar. 13, 1928 |